United States Patent Office 2,848,456
Patented Aug. 19, 1958

2,848,456

DEHYDRATION OF 2-PYRIDINE ETHANOL TO 2-VINYL PYRIDINE

Harold L. Dimond, Lee J. Fleckenstein, and Marvin O. Shrader, Pittsburgh, Pa., assignor to Pittsburgh Coke & Chemical Company, Pittsburgh, Pa., a corporation of Pennsylvania No Drawing. Application March 27, 1956
Serial No. 574,088

5 Claims. (Cl. 260—290)

The present invention relates to the preparation of 2-vinyl pyridine from 2-pyridine ethanol.

It is an object of the present invention to prepare 2-vinyl pyridine, using simple reaction conditions and obtaining increased yields thereof.

A further object is the preparation of 2-vinyl pyridine from 2-pyridine ethanol at atmospheric pressure.

An additional object is to prepare 2-vinyl pyridine while, at the same time, avoiding resin formation.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

It has now been found that these objects can be attained by dehydration of 2-pyridine ethanol while, simultaneously, steam distilling the 2-vinyl pyridine formed as the dehydration of the 2-pyridine ethanol occurs. The reaction can be carried out at atmospheric pressure and the yield of 2-vinyl pyridine is over 95% of the theoretical and is normally substantially 100%.

It is surprising that such good yields can be obtained by the present process, as merely dehydration of 2-pyridylethanol by distillation from alkali, as shown in Ladenburg, Berichte der Deutschen Chemischen Gesellschaft, vol. 22, page 2585, gives yields of 75% or less and is accompanied by resin-forming side reactions. It has been proposed in Kauffman, Patent No. 2,556,845, to prepare 2-vinyl pyridine from a mixture including a pyridine ethanol having at least two ethanol groups thereon. Kauffman states that he obtains a yield of 114%, based on the monomethylol present, see Example 1, but he does not show what percentage of his starting material is monomethylol compound and what percentage is dimethylol compound, so that it cannot be determined what is the actual yield on total starting material. Kauffman uses pressures of 100 mm. or less in his reaction and attributes the yield of over 114% to the fact that part of his dimethylol compound loses formaldehyde. Starting from the monomethylol compound in his process, he states that the yield of monovinyl product is only about 87% of theoretical.

In the process of the present invention, it has been ascertained that, if a diethanol (or higher ethanol) pyridine of the type employed by Kauffman is used, there is no formation of a monovinyl pyridine and, if a mixture of a diethanol (or higher ethanol) pyridine and 2-pyridine ethanol are used, there is formed an amount of 2-vinyl pyridine corresponding solely to the amount of 2-pyridine ethanol. In no case was there any evidence of formaldehyde being formed. In all of the Kauffman examples, pressures of 100 mm. or less are employed. It is evident, therefore, that the present process is fundamentally different from the process of Kauffman.

The Kauffman process suffers from the disadvantage that there is undesirable polymerization of the vinyl pyridine. Moreover, in this process, a mixture containing both α-picoline and vinyl pyridine is obtained and it is relatively difficult to separate these two materials, due to their relatively close boiling points. In the process of the present invention, the pyridine ethanol is separated from the α-picoline before the vinyl pyridine is formed. 2-pyridine ethanol and 2-vinyl pyridine boil so far apart that it is a simple matter to separate them by distillation.

It is possible to prepare 2-vinyl pyridine in excellent yields by heating 2-β hydroxyethyl pyridine to a temperature of at least 130° C. in the presence of an alkali metal hydroxide at a subatmospheric pressure of less than 100 mm. of mercury. This process suffers from the disadvantage of using expensive vacuum equipment. In this process also, if an attempt is made to raise the pressure above 100 mm., the vinyl pyridine cannot be separated by distillation, but, instead, it polymerizes.

In view of the fact that water is a product of the dehydration of 2-pyridine ethanol to 2-vinyl pyridine, it is indeed surprising that, by deliberately adding water during the formation of the 2-vinyl pyridine, as in the process of the present invention, it is possible to obtain good yields of the desired product (normally over 95%) while using simpler conditions than those previously known.

In a typical example, there were charged into a 3-liter autoclave, equipped with a stirrer and thermometer, 1862 grams of α-picoline and 406 grams of 37% aqueous formaldehyde. This mixture was heated to 150° C. under a pressure of 130 p. s. i. and held there for 12 hours. The mixture was cooled and discharged; weight 2220 grams. The mixture was transferred to a distilling flask and heated to a pot temperature of 140° C. to remove the water and most of the unreacted α-pyridine.

After the condensation step, the reaction mixture was distilled at 20 mm. pressure to 110° C. vapor temperature to drive off the remainder of the α-picoline, to obtain 466 grams of residue. This residue was divided into several portions. One portion, weighing 52.6 grams, was further fractionated at 20 mm. pressure to give the following fractions:

| | Grams |
|---|---|
| (1) 110° to 128° C | 5.4 |
| (2) 125° to 128° C | 2.6 |
| (3) 128° to 133° C | 24.9 |
| (4) 133° to 138° C | 9.2 |
| (5) 138° to 144° C | 3.7 |
| (6) Residue | 6.8 |
| | 52.6 |

Cuts 3 and 4 totaling 34.1 grams (65%) where essentially β-(2-pyridyl) ethanol and substantially none of this compound occurred in the other fractions.

While the above method of forming the β-(2-pyridyl) ethanol is the preferred one, this starting material can also be prepared by any of the conventional processes with or without the used of catalysts.

Another 52.6 grams (47 cc.) portion of the residue, boiling above 110° C. at 20 mm., was dissolved in 50 cc. of water. This mixture was added dropwise to 20 cc. of 50% aqueous NaOH at 150° to 160° C. over 2 hours. As the run progressed, 25 cc. of water was slowly added to the alcohol over the two hours period to effect further dilution. The pot temperature was slowly raised to 190° C. after all the alcohol was added. The reaction was then stopped. The distillate consisted of two colorless layers. The distillate was treated with 25 cc. of 50% NaOH. The layers were separated and the organic layer was dried over anhydrous sodium carbonate. 28 grams of dried 2-vinyl pyridine was obtained. This was a 96.4% yield, based on the β-(2-pyridyl) ethanol employed. Actually, the yield was higher, since some of the 2-vinyl pyridine was absorbed on the sodium carbonate drying agent. In other runs, substantially 100% yields of 2-vinyl pyridine have been obtained.

The aqueous solution of the 2-pyridine ethanol should be added to the aqueous sodium hydroxide at such rate that dehydration occurs and the vinyl pyridine is simultaneously steam-distilled.

In the process of the present invention, the following operating conditions can be employed. The amount of water added with the pyridine ethanol can be varied between one and 6 parts by weight per part of the pyridine ethanol. Enough water should be used to form the azeotrope. If too little water is employed, undesired polymerization will occur while, if too much water is used, the reaction will be unnecessarily long in time. In place of adding aqueous pyridine ethanol to caustic, it also is possible, but less preferable, to pass steam through a mixture of caustic and 100% pyridine ethanol to obtain a steam distillation.

In place of sodium hydroxide, there can be used potassium hydroxide or other strong inorganic alkali material in the dehydration. A particularly effective mixture is made up of 60% NaOH–40% KOH at a concentration of 50% total alkali. The concentration of the caustic can be varied between 25% to 75%. If too little caustic is used, satisfactory dehydration does not occur while, if too much caustic is employed, the cost of the process is increased without any attendant advantage.

The time of dehydration can be varied between 1½ and 5 hours. A time of 3½ hours has often been found desirable. It is undesirable to use an addition time of much less than 1½ hours, as there would be too great a concentration of vinyl pyridine in hot caustic, which would give rise to undesired polymerization. The use of a distillation time above about 3½ hours normally serves no advantage and renders the process less attractive from the economic point of view.

While the recited temperature of 150° to 160° C. is preferred, it is possible to vary the temperature to some extent. Thus, a temperature of 140° C. can be employed. At a temperature of 100° C., however, the desired steam distillation will not take place, and at intermediate temperatures, the reaction takes an undesirably long time. At more elevated temperatures, charring and polymerization occur and, hence, normally temperatures above 225° C. are not used.

Atmospheric pressure is used in the example during the dehydration step and this is preferred. The process, however, can be carried out at superatmospheric pressure or subatmospheric pressure.

The drying agent can be sodium carbonate, calcium chloride, sodium hydroxide or other conventional drying agents.

We claim:

1. A process for the preparation of 2-vinyl pyridine which comprises adding an approximately 50% water solution of 2-pyridine ethanol to a 50% aqueous solution of sodium hydroxide in an amount to give about 15% of sodium hydroxide, based on the weight of the 2-pyridine ethanol, over a period of about 3½ hours at 150° to 160° C., said process being carried out at atmospheric pressure, whereby 2-vinyl pyridine is simultaneously steam distilled, separating the vinyl pyridine layer from the aqueous layer in the distillate, drying and recovering the vinyl pyridine.

2. A process for the preparation of 2-vinyl pyridine which comprises adding over a period of 3½ hours an approximately 50% water solution of 2-pyridine ethanol to a 50% aqueous solution of caustic alkali in an amount sufficient to cause dehydration of the 2-pyridine ethanol at a temperature of 150° to 160° C., whereby 2-vinyl pyridine is simultaneously steam distilled, said process being carried out at atmospheric pressure.

3. A process for the preparation of 2-vinyl pyridine which comprises adding over a period of at least about 1½ hours a solution of one part 2-pyridine ethanol in one to 6 parts water by weight to a strong inorganic alkali in an amount sufficient to cause dehydration of the 2-pyridine ethanol at a temperature of from 100° to 250° C., whereby 2-vinyl pyridine is simultaneously distilled, said process being carried out at atmospheric pressure.

4. A process for the preparation of 2-vinyl pyridine which comprises adding over a period of at least about 1½ hours at atmospheric pressure a solution of one part 2-pyridine ethanol and one to 6 parts water by weight to a strong inorganic alkali in an amount sufficient to cause dehydration of the 2-pyridine at a temperature of from 100 to 250° C., whereby 2-vinyl pyridine is simultaneously distilled.

5. A process for the preparation of 2-vinyl pyridine which comprises adding as the sole reactant over a period of about 1½ to 3½ hours a solution of one part 2-pyridine ethanol in one to 2 parts by weight to a strong inorganic alkali in an amount sufficient to cause dehydration of the 2-pyridine ethanol at a temperature of from 100 to 250° C., whereby 2-vinyl pyridine is simultaneously distilled, said process being carried out at atmospheric pressure.

References Cited in the file of this patent

UNITED STATES PATENTS 2,556,845    Kauffman    June 12, 1951

FOREIGN PATENTS 632,661    Great Britain    Nov. 28, 1949

OTHER REFERENCES

Ladenburg: Ber. Deut. Chem., vol. 22, pp. 2583–5 (1889).